US012174720B2

(12) United States Patent
Shachar et al.

(10) Patent No.: US 12,174,720 B2
(45) Date of Patent: Dec. 24, 2024

(54) SYSTEM AND METHOD FOR MANAGING DATA STRUCTURE LOCKING BASED SECURITY THREATS

(71) Applicant: Dell Products L.P., Round Rock, TX (US)

(72) Inventors: Tomer Shachar, Beer-Sheva (IL); Maxim Balin, Gan-Yavne (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 309 days.

(21) Appl. No.: 17/863,475

(22) Filed: Jul. 13, 2022

(65) Prior Publication Data

US 2024/0020213 A1 Jan. 18, 2024

(51) Int. Cl.
*G06F 16/00* (2019.01)
*G06F 11/07* (2006.01)
*G06F 11/30* (2006.01)
*G06F 21/77* (2013.01)

(52) U.S. Cl.
CPC ...... *G06F 11/3072* (2013.01); *G06F 11/0709* (2013.01); *G06F 21/77* (2013.01)

(58) Field of Classification Search
CPC .. G06F 21/77; G06F 11/3072; G06F 11/0709; G06F 2221/2151
See application file for complete search history.

(56) References Cited

U.S. PATENT DOCUMENTS 9,485,271 B1 * 11/2016 Roundy .............. H04L 63/1441
11,023,607 B1 * 6/2021 Mantin ................. G06F 21/554

\* cited by examiner

*Primary Examiner* — Yicun Wu
(74) *Attorney, Agent, or Firm* — Womble Bond Dickinson (US) LLP

(57) ABSTRACT

Methods and systems for managing the operation of data processing systems are disclosed. The data processing systems may provide computer implemented services to any type and number of other devices and/or users of the data processing systems. To improve the likelihood of the data processing systems being able to provide the computer implemented services, a system may proactively attempt to identify and remediate attempts to limit access to data stored in the data processing systems. To do so, a security framework may be implemented by the system. The security framework may include both proactive identified of and remediation of maliciously locked data structures based on user data access patterns.

20 Claims, 7 Drawing Sheets

SYSTEM AND METHOD FOR MANAGING DATA STRUCTURE LOCKING BASED SECURITY THREATS

FIELD OF THE DISCLOSURE

Embodiments relate generally to managing device operation. More particularly, embodiments relate to systems and methods to manage the operation of devices that may be subject to malicious activity.

BACKGROUND

Computing devices may store data and used stored data. For example, computing devices may utilize data when providing computer implemented services. If computing devices are unable to access data, the computing devices may be unable to provide some, or all, of the computer implemented services that the computing devices are able to provide with access to data.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1:
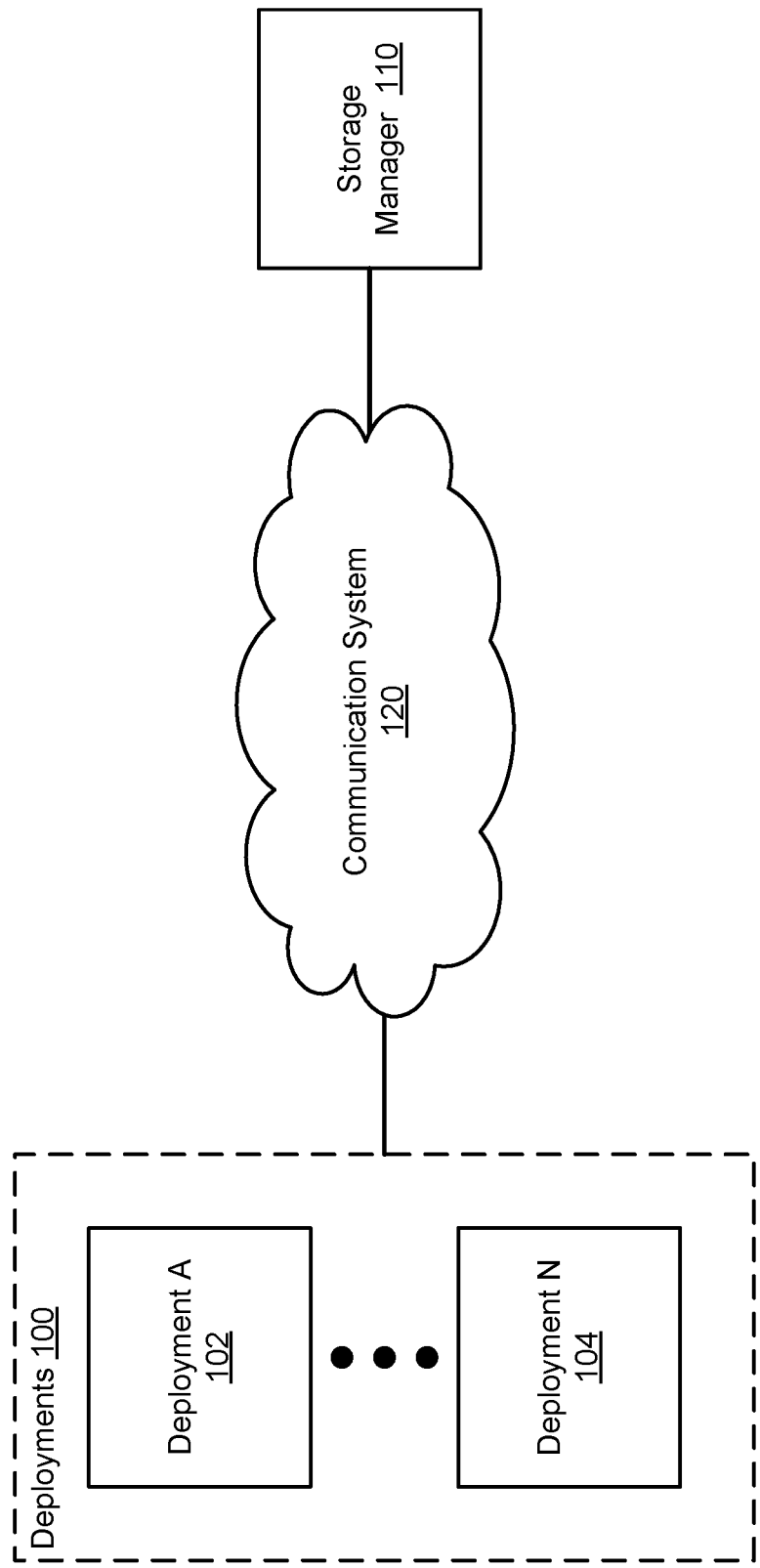
FIG. 1 shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the operation of data processing systems. The data processing systems may provide computer implemented services to any type and number of other devices and/or users of the data processing systems.

The data processing systems may be a part of a distributed system. As part of the distributed system, the data processing systems may be exposed to malicious parties that may attempt to influence the operation of the data processing system in an undesirable manner. For example, the malicious parties may attempt to limit access to data stored by the data processing systems. The malicious parties may do so by locking data structures for access through mechanisms designed to manage multi-user user of data structures. For example, a system may limit access to data structures to sequential access. Consequently, a data structure locked for use by a user may prevent other users from accessing the data structures.

To improve the likelihood of the data processing systems being able to provide the computer implemented services, a system in accordance with embodiment may proactively attempt to identify and remediate attempts to limit access to data (e.g., necessary for performance of all, or a portion, of the computer implemented services). To do so, a security framework may be implemented that proactively identifies maliciously locked data structures and returns access to the maliciously locked data structures.

To proactively identify maliciously locked data structures, the system may monitor data access patterns of users and perform anomalous activity detection with respect to the data access patterns. Anomalous activity in the data access patterns may be treated as malicious activity. Consequently, an automated response may be performed when anomalous data access by users is identified. The automated response may include automatically unlocking impacted data structures, restricting data access privileges, and/or other actions.

In this manner, an embodiment disclosed herein may improve the uptime of computer implemented services in a distributed system and reduce a cognitive burden on administrators of the distributed system for management purposes, as well as providing other advantages.

In an embodiment, a computer-implemented method for managing data in a distributed system is provided. The method may include obtaining a suspect activity log for a user of the distributed system, the suspect activity log being based on data structure lock commands issued by the user for data stored in the distributed system; performing a comparison between the suspect activity log for the user and a user profile for the user to determine whether the data structure lock commands are anomalous activity for the user; and in an instance whether the data structure lock commands are anomalous activity for the user: performing an action set to facilitate access to data structures stored in the distributed system that are impacted by the data structure lock commands.

Performing the comparison may include, for each of the data structures impacted by the data structure lock commands, identifying whether the user made a substantive use of the respective data structure while impacted by a corresponding data structure lock command to identify a ratio of substantively used data structures to non-substantively used data structures; and determining that the data structure lock commands are anomalous activity in an instance where the ratio exceeds a predetermined threshold.

Performing the comparison may include identifying a ratio between a quantity of data structures impacted by the data structure lock commands and a quantity of data structures that the user has permission to lock; and determining that the data structure lock commands are anomalous activity in an instance where the ratio exceeds a predetermined threshold.

Performing the comparison may include, for each of the data structures impacted by the data structure lock commands, identifying duration of time that the respective data structure was impacted by a corresponding data structure lock command; making a comparison between the duration of time and a corresponding duration of time specified by a user profile associated with the user to identify a quantity of data structures that were unavailable to other users for an unusually long duration of time; and determining that the data structure lock commands are anomalous activity in an instance where the quantity exceeds a predetermined threshold.

Performing the comparison may include, for each of the data structures impacted by the data structure lock commands, identifying: a duration of time that the respective data structure was impacted by a corresponding data structure lock command; identifying a latency of response by storage devices impacted by the data structure lock commands; making a comparison between: the duration of time and a corresponding duration of time specified by a user profile associated with the user to identify a quantity of data structures that were unavailable to other users for an unusually long duration of time, the latency of response by the storage devices a historical latency of response by the storage devices; and determining that the data structure lock commands are anomalous activity in an instance where the quantity exceeds a predetermined threshold and the latency of response exceeds the historical latency of response by a predetermined quantity.

Performing the action set may include issuing unlock command for at least a portion of the data structures stored in the distributed system that are impacted by the data structure lock commands.

Performing the action set may also include preventing the user from issuing additional data structure lock commands.

The user profile may indicate a types of data structures regularly accessed by the user, and durations of time that the user locks the data structures.

The computer-implemented method may additionally include prior to obtaining the suspect activity log, monitoring data structure access patterns for the user to facilitate generation of the user profile. The computer-implemented method may also include identifying types of data structures indicated by the data structure access patterns; and populating the user profile with access frequencies for the types of the data structures.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any type and quantity of computer implemented services. The system may include, but is not limited to, one or more deployments 100 operably connected to storage manager 110. Each of these components is discussed below.

All, or a portion, of deployments 102-104 may provide computer implemented services to users and/or other computing devices operably connected to the deployments 100. The computer implemented services may include any type and quantity of services including, for example, database services, instant messaging services, video conferencing services, etc. To provide these services, deployments 100 may host applications that provide these (and/or other) computer implemented services. When providing the computer implemented services, deployments 100 may store various portions of data (e.g., in local storage) and retrieve various portions of stored data.

The computer implemented services may presume that data may be stored for future use and stored data may be retrieved for use in the future. If such capabilities are not available, then deployments 100 may not be capable of providing the computer implemented services.

For example, consider a scenario where a deployment is providing database services. To provide the database services, the deployment may obtain data from a client (not shown) and store the data in a repository. In the future, the deployment may retrieve the data from the data repository to service future data access requests (e.g., read/writes) for the data.

To provide the computer implemented services to other entities, deployments 100 may be operably connected to any number of other devices via communication system 120.

However, as disclosed herein, it has been found that processes for storing and/or accessing stored data may service as an attack vector for malicious parties to attempt to compromise the operation of one or more of deployments 100. For example, the malicious parties may attempt to limit access to stored data utilized by deployments 100. If so limited, the malicious entities may attempt (and/or succeed at) denying performance of all or a portion of the computer-implemented service provided by the respective deployments.

In general, embodiments disclosed herein provide methods, devices, and systems for improving the likelihood of successfully providing computer-implemented services. To improve the likelihood of successfully providing computer implemented services, a system in accordance with an embodiment may proactively monitor data access patterns with users. The monitored data access patterns may be used to identify data structures (e.g., files, folders, etc.) that may be impacted by malicious data structure lock commands. When such data structures are identified, the system may automatically take action to facilitate access to the impacted data structures. By doing so, the system may be more likely to provide desired computer implemented services through continued access to data structures necessary to provide the computer implemented services.

For example, consider a scenario where a user account is compromised by a malicious entity. The malicious entity may use the aforementioned access to issue data structure lock commands for various data structures to prevent the data structures from being utilized by other users. The malicious entity may do so without intent to utilize the locked data structures and specifically to prevent use of the files by other entities. However, the aforementioned activity may diverge from typical access patterns of the user. Embodiments disclosed herein may monitor access patterns of users to identify anomalous activity of the users. An occurrence of anomalous access patterns of a user may be treated as indicating that data structures locked by the user have been impacted by malicious data structure lock commands. The system may then take action to facilitate access to the locked data structures and/or reduce the likelihood that other data structures are impacted by future malicious data structure lock commands.

The data structure lock commands may take the form of, for example, server message block (SMB) commands issued by components of a distributed system. The SMB commands may be used to manage access to data structures in a multi-user environment (e.g., to prevent co-current write access to files which may result in inconsistent or otherwise undesired data structures).

To provide the above noted functionality, a system in accordance with an embodiment may include storage manager 110. Storage manager 110 and deployments 100 may cooperate to improve access to data structures that may be impacted by malicious data structure lock commands.

Deployments 100 and/or storage manager 110 may be implemented with one or more data processing systems. A data processing system may include one or more computing devices. Any of the deployments (e.g., 102, 104) and/or storage manager 110 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to Refer to FIG. 2A for additional details regarding deployments 100, FIG. 2B for additional details regarding storage manager 110, and FIG. 6. For additional details regarding computing devices.

In an embodiment, one or more of deployments 100 and storage manager 110 are operably connected via communication system 120. Communication system 120 may allow any of deployments 100 and storage manager 110 to communication with one another (and/or with other devices not illustrated in FIG. 1). To provide its functionality, communication system 120 may be implemented with one or more wired and/or wireless networks. Any of these networks may be private, public, and/or may include the Internet. For example, deployments 100 may be operably connected to one another via a local network which is operably connected to the Internet. Similarly, storage manager 110 may be operably connected a second local network which is also operably connected to the Internet thereby allowing any of deployments 100 and storage manager 110 to communication with one another and/or other devices operably connected to the Internet. Deployments 100, storage manager 110, and/or communication system 120 may be adapted to perform one or more protocols for communicating via communication system 120.

While illustrated in FIG. 1 with a limited number of specific components, a system may include additional, fewer, and/or different components without departing from embodiments disclosed herein.

Figure 2A:
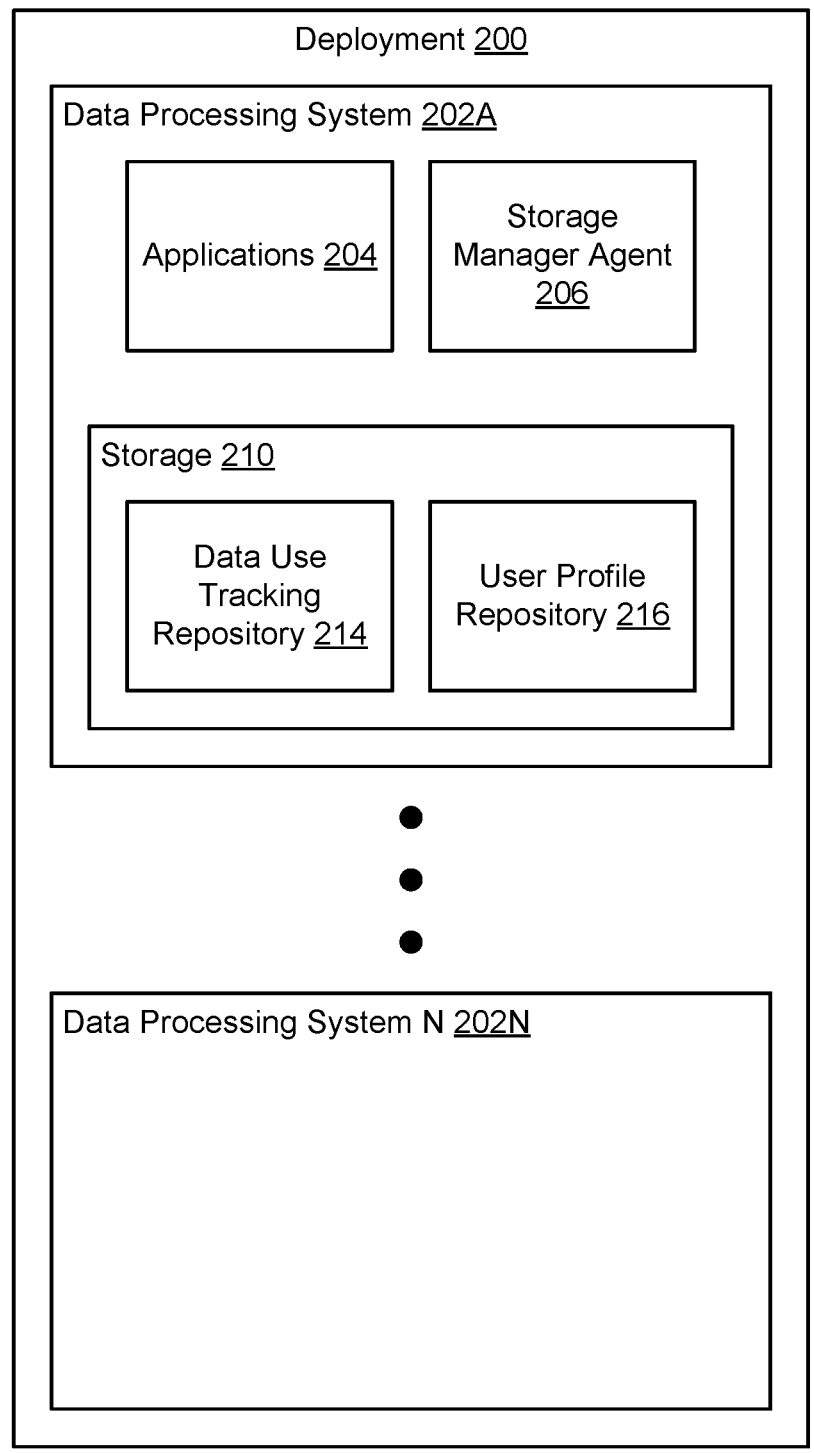
FIG. 2A shows a block diagram illustrating a data processing system in accordance with an embodiment.

Turning to FIG. 2A, a diagram of an example deployment 200 in accordance with an embodiment is shown. Deployment 200 may be similar to any of deployments 100.

Deployment 200 may provide computer implemented services to various client devices (not shown) and/or users of data processing systems (e.g., 202A-202N) of deployment 200. Additionally, deployment 200 may proactively monitor and/or address data structures impacted by malicious data structure lock commands in isolation and/or cooperation with storage manager 110. While described as separate devices, any of data processing systems 202A-202N may provide the functionality of storage manager 110.

To provide the aforementioned functionality, deployment 200 may include any number of data processing systems 202A-202N. Any of the data processing systems may be implemented using a computing devices. Any of data processing systems 202A-202N may include one or more applications 204, a storage manager agent 206, and storage 210. Each of these components is discussed below.

Applications 204 may provide computer implemented services. When doing so, applications 204 may store and/or retrieve copes of stored application data (not shown) in storage 210, storage of other data processing systems, and/or storage of other devices (e.g., a network attached storage). Consequently, the operation of applications 204 may be predicated on the accessibility of the application data. Accordingly, deployment 200 may be unable to provide all or a portion of its computer implemented services if various portions of the application data are unavailable to access due to, for example, malicious data structure lock commands directed to the portions of the application, folders in which the application data portions are stored, etc.

Storage manager agent 206 may (i) mediate presentation of storage 210 and/or other available storages to applications 204, (ii) monitor access patterns of users (e.g., stored as part of data use tracking repository 214), (iii) compare the access patterns to user profiles for the users (e.g., stored in user profile repository) to identify potentially malicious data structure lock commands, and/or (iv) coordinate with and/or act as an agent of a storage manager and/or perform the functionality of a storage manager to remediate maliciously locked data structures. By doing so, portions of application data subject to malicious data structure lock commands may be unlocked for continued use by other entities in a timely manner.

Figure 3:
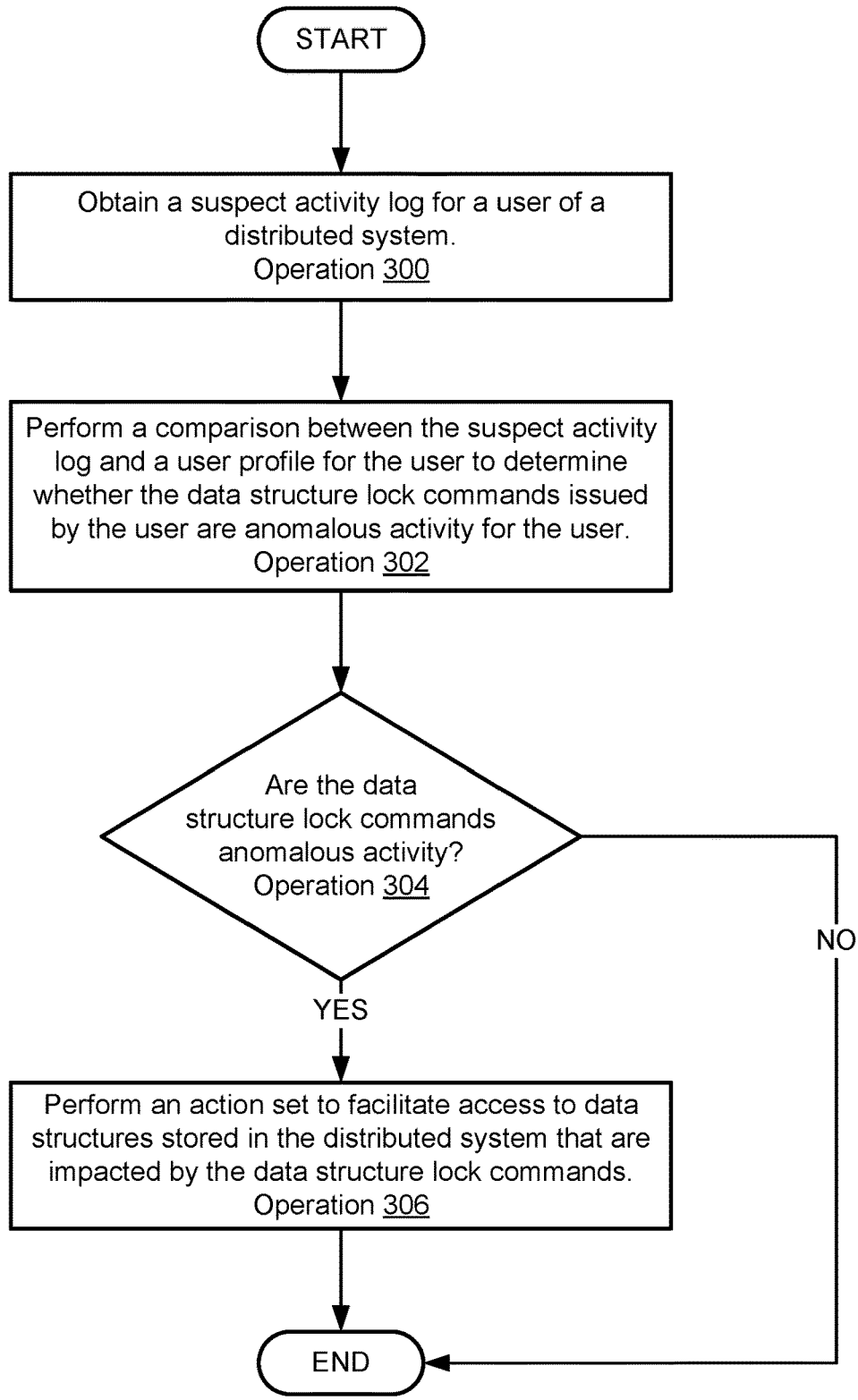
FIG. 3 shows a flow diagram illustrating a method of managing data processing systems in accordance with an embodiment.
Figure 4:
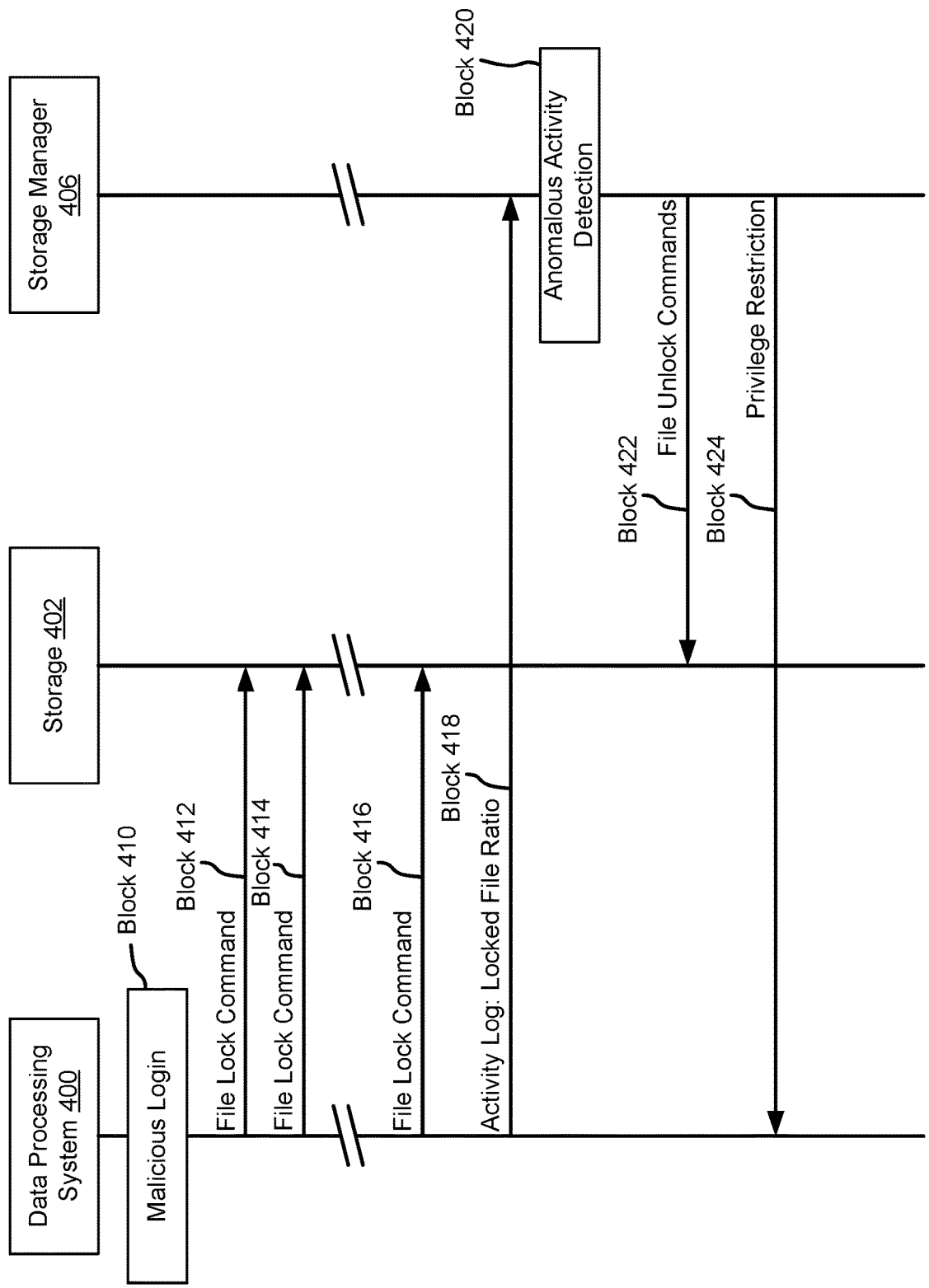
FIG. 4 shows a diagram illustrating blocks showing operation of a first system over time in accordance with an embodiment.
Figure 5:
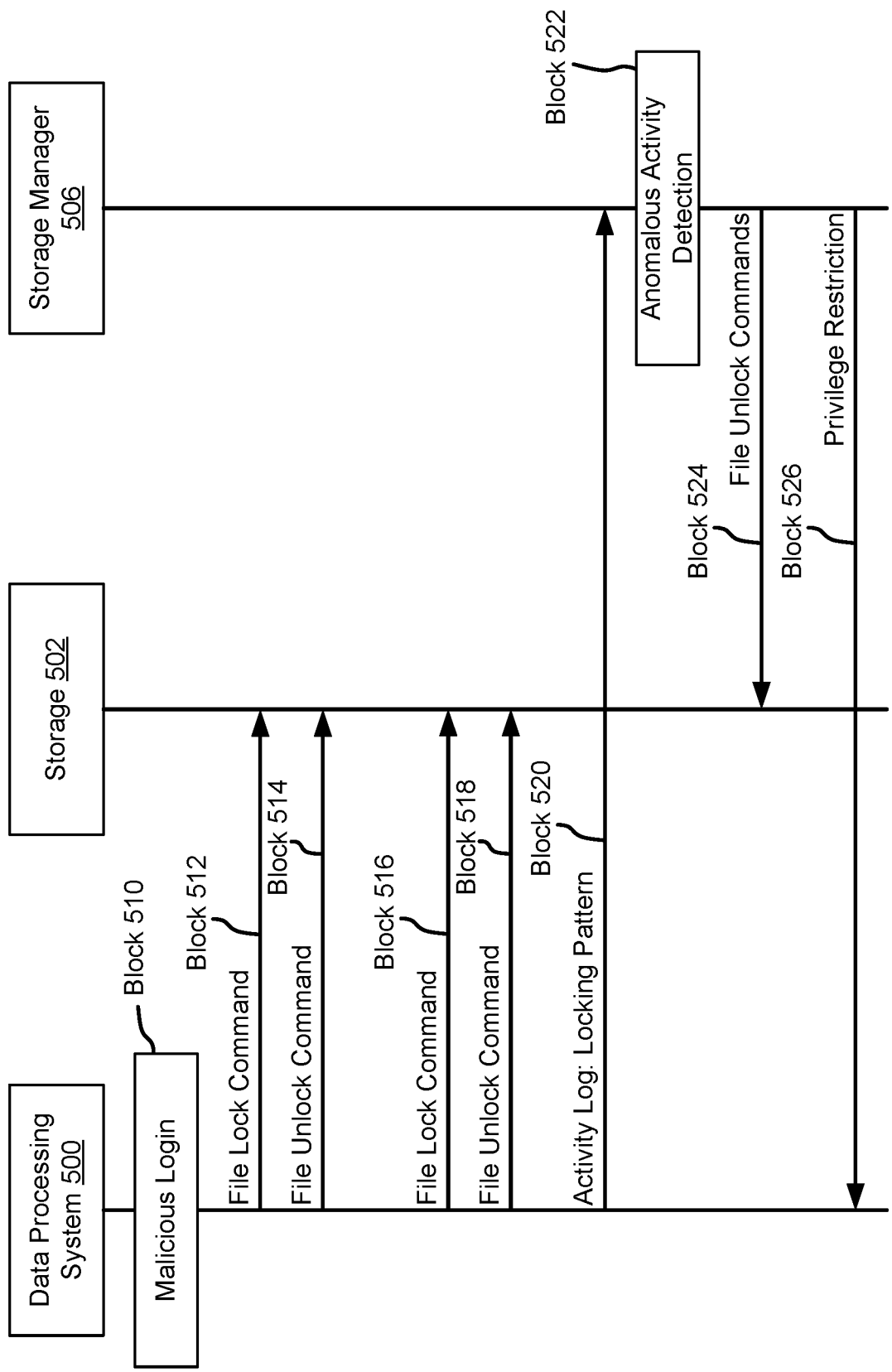
FIG. 5 shows a diagram illustrating blocks showing operation of a second system over time in accordance with an embodiment.

When providing its functionality, storage manager agent 206 may perform all or a portion of the methods and operations illustrated in FIGS. 3-5.

In an embodiment, one or more of applications 204 and storage manager agent 206 are implemented using a hardware device including circuitry. The hardware device may be, for example, a digital signal processor, a field programmable gate array, or an application specific integrated circuit. The circuitry may be adapted to cause the hardware device to perform the functionality of applications 204 and/or storage manager agent 206. Applications 204 and/or storage manager agent 206 may be implemented using other types of hardware devices without departing embodiment disclosed herein.

In one embodiment, one or more of applications 204 and storage manager agent 206 are implemented using a processor adapted to execute computing code stored on a persistent storage that when executed by the processor performs the functionality of applications 204 and/or storage manager agent 206 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including application data (not shown), data use tracking repository 214, and/or user profile repository 216. Each of these data structures is discussed below.

Application data may be implemented using one or more data structures that include any type and quantity of data usable, stored by, and/or otherwise desired by applications 204. Application data may include, for example, databases, repositories, lists, tables, and/or any other types of data structures storing any type and quantity of data.

Data use tracking repository 214 may be implemented with one or more data structures that include information regarding data structures accessed by users. The access information may include, for example, logs of the data structures accessed by a user. The logs may indicate the data structures, time of access, duration of access, and/or other types of information regarding access of data structures by one or more users. Access patterns for multiple users may be stored in data use tracking repository 214. In an embodiment, the access patterns include information regarding locking of data structures by the users. For example, the logs may include information derived from SMB2 lock requests/commands issued to various storages of a deployment.

User profile repository 216 may be implemented with one or more data structures that include any quantity and type of information usable to discriminate anomalous access patterns of users from normal or typical access patterns of users. For example, user profile repository 216 may include, for a user, information regarding (i) commonly accessed data structures, (ii) durations of the commonly accessed data structures, (iii) thresholds within which a corresponding user typically operates, (iv) ratios or other information regarding access patterns of a user normalized for time, and/or (v) other types of information and/or statistics regarding typical access patterns of the user. The aforementioned information may be compared to the actual access patterns of the user which may be stored in data use tracking repository 214 to identify whether anomalous access are present in the access patterns of the user. The information in user profile repository 216 may be based on historical information for users. For example, access patterns of the user may be monitored over time and may be used to identify thresholds, ratios, and/or other criteria that if met, indicate that the access by the user may include malicious data structure lock commands.

For example, user profile repository 216 may specify, for a user, a duration of time which a user typically maintains data structures in a locked state, a level of variability in the durations of time that the data structures are in the locked state, latencies of storages when the user utilizes data structures stored in the storages, and/or other types of information regarding access of data structures by the user. The aforementioned information may be used as thresholds that define when an access pattern of the user includes anomalous activity. For example, a user may typically utilize storages in a manner that do not significantly impact the latency of the storage. If, however, a subsequent access pattern by the user results in an increase in the latency of the storage, then it may be concluded that the access pattern includes at least a portion of anomalous activity and may be treated as including malicious data structure lock commands.

While various data structures have been illustrated and described in FIG. 2A with specific structures, any of the data structures may be implemented with any type of structure (e.g., lists, tables, linked lists, databases, etc.), stored in different locations, and/or spanned across any number of devices without departing from embodiments disclosed herein. Further, any of these data structures may be combined with other types of data, or divided into any number of data structures to provide for separation at any level of granularity.

Any of data processing systems 202A-202N may perform similar or different functions when compared to the functions performed by other data processing systems of deployment 200.

While illustrated in FIG. 2A with a limited number of specific components, a deployment may include additional, fewer, and/or different components without departing from embodiments disclosed herein.

Figure 2B:
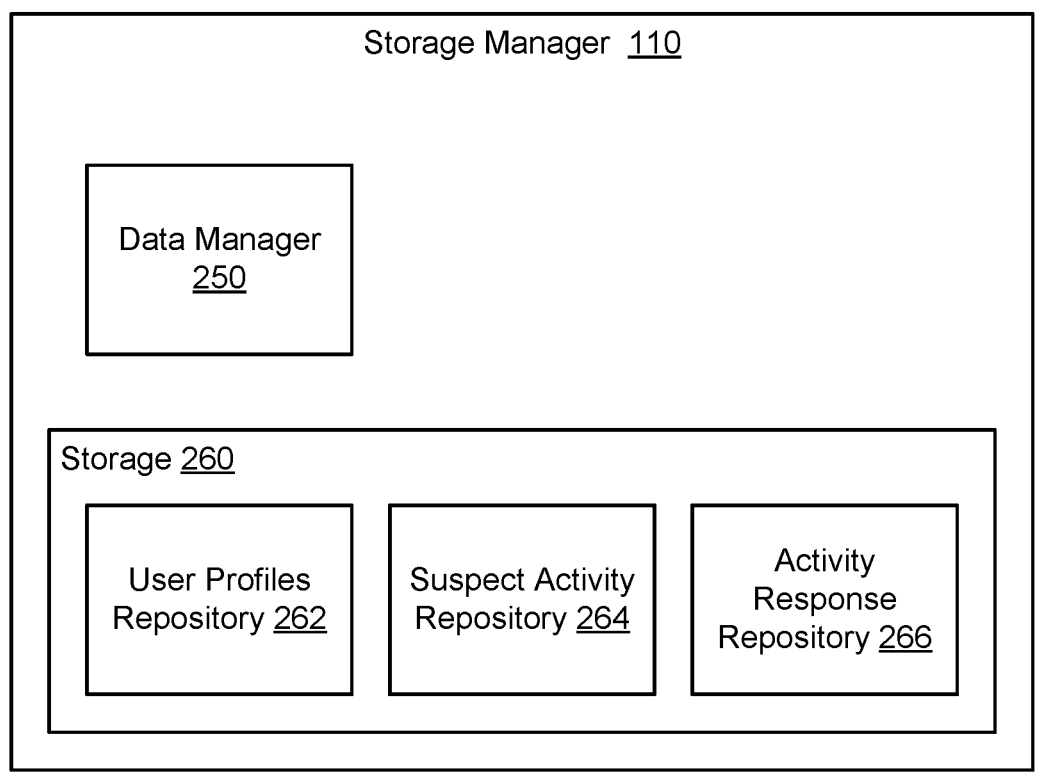
FIG. 2B shows a block diagram illustrating a storage manager in accordance with an embodiment.

Turning to FIG. 2B, a diagram of storage manager 110 in accordance with an embodiment is shown. To provide it functionality, storage manager 110 may include data manager 250 and storage 260. Each of these components is discussed below.

Data manager 250 may provide access pattern anomaly detection services and/or maliciously locked data structure remediation services. These services may include 1) access patterns for user which may be implemented with logs of data structure lock commands, data structure uses/accesses by the user, and/or may include other information, (ii) comparing the access patterns to a user profile for a user which may be stored in user profiles repository 262 to identify anomalous activity, and/or (iii) for detected anomalous activity, preform action sets to remediate malicious locked data structures. By doing so, storage manager 110 may improve accessibility to data through proactive identification and remediation of maliciously locked data structures.

While providing its functionality, data manager 250 may perform all, or a portion, of the methods, operations, and actions illustrated in FIGS. 3-5.

In an embodiment, storage 260 is implemented using physical devices that provide data storage services (e.g., storing data and providing copies of previously stored data). The devices that provide data storage services may include hardware devices and/or logical devices. For example, storage 260 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 260 may include a memory device (e.g., a dual in line memory device) in which data is stored and from which copies of previously stored data are provided. In another example, storage 260 may include a persistent storage device (e.g., a solid-state disk drive) in which data is stored and from which copies of previously stored data is provided. In a still further example, storage 260 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 260 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 260 may store data structures including user profiles repository 262, suspect activity repository 264, and/or activity response repository 266. Each of these data structures is discussed below.

User profiles repository 262 may be implemented with one or more data structures that include information regarding typical access patterns of user, discussed with respect to FIG. 2A. The user profiles of user profiles repository 262 may facilitate discrimination of anomalous activity from normal activity in the access patterns of users.

Suspect activity repository 264 may be implemented with one or more data structures that include information regarding access patterns of users that are suspected of being malicious (e.g., through compromise of access credentials of the user). For example, suspect activity repository 264 may include logs that include information regarding the access patterns of users. The logs may indicate information regarding data structure locking by a user. Information from (or derived from) the logs may be compared to information from user profiles to ascertain whether some of the activity of the user with respect to data structure access is anomalous.

Activity response repository 266 may be implemented with one or more data structures that include information usable to response to identified anomalous activity. For example, activity response repository 266 may include lists of actions keyed to anomalous activity. The actions may include, for example, issuing data structure unlock commands (e.g., to facilitate access to data structures that are believed to have been maliciously locked), suspending access privileges of users (e.g., to limit the ability of the user to lock data structures), notifying administrators of anomalous activity, and/or other actions that may be used to remediate maliciously locked data structures and/or reduce the likelihood of data structures being maliciously locked in the future.

While various data structures have been illustrated and described in FIG. 2B with specific structures, any of the data structures may be implemented with any type of structure (e.g., lists, tables, linked lists, databases, etc.), stored in different locations, and/or spanned across any number of devices without departing from embodiments disclosed herein. Further, any of these data structures may be combined with other types of data, or divided into any number of data structures to provide for separation at any level of granularity.

While illustrated in FIG. 2B with a limited number of specific components, a storage manager may include additional, fewer, and/or different components without departing from embodiments disclosed herein.

As discussed above, the components of FIG. 1 may perform various methods to increase the likelihood of data processing systems being able to provide computer implemented services by proactively identifying and/or remediating locked data structures. FIG. 3 illustrates an example of a method that may be performed by the components of FIG. 1. In the diagrams discussed below and shown in FIG. 3, any of the operations may be repeated, performed in different orders, and/or performed in parallel with or a partially overlapping in time manner with other operations.

Turning to FIG. 3, a flow diagram illustrating a method of managing suspect activity of users in according to an embodiment is shown. The method may be performed, for example, by a data processing system, components thereof, and/or a storage manager.

Prior to operation 300, profiles for users of a data processing system may be established based on normal activities of the users. The user profiles may include typical accesses of data structures by the users.

At operation 300, a suspect activity log for a user of a distributed system is obtained. The suspect activity log for the user may be obtained by (i) monitoring activity of the user with respect to accessing stored data and storing information regarding the monitored activity in a log in storage or an in-memory data structure, (ii) reading the information from a stored log, and/or (iii) receiving the log from another entity (e.g., another data processing system). The user may utilize a data processing system which performs the monitoring through any mechanism (e.g., issuing a watch instruction to a storage management entity). The logged activity may include information regarding data structures accessed by and/or locked by the user over time.

At operation 302, a comparison between the suspect activity log and a user profile for the user may be performed to determine whether data structure lock commands issued by the user (e.g., during the monitoring) are anomalous activity for the user. The comparison may be made by (i) comparing the information in the suspect activity log to various metrics (e.g., thresholds, criteria) in the user profile which if met indicate that the data structure lock commands are anomalous activity for the user, (ii) feeding the suspect activity log and/or user profile as input to an inference model which may output an indication regarding whether the data structure lock commands are anomalous activity for the user, and/or (iii) via other methods.

The inference model may, for example, be implemented with a trained machine learning model. The trained machine learning model may be trained using previous data access patterns of the user and may provide a classification regarding whether a new data access pattern (e.g., defined by the suspect activity log) is similar to or different from the known user access patterns.

In an embodiment, the comparison is made by, for each of the data structures impacted by the data structure lock commands, identifying whether the user made a substantive use of the respective data structure while impacted by a corresponding data structure lock command to identify a ratio of substantively used data structures to non-substantively used data structures. For example, if a user locked three files and only write data to one of the three files, then the ratio may be determined as 1/3. The ratio may be compared to a threshold or other criteria (e.g., specified by the user profile and/or a general profile applicable to all users) to ascertain whether the data structure lock commands are anomalous activity. For example, if the threshold is 0.25 with lower ratios indicating anomalous activity, then in this example the comparison may not indicate anomalous activity of the user.

In an embodiment, the comparison is made by identifying a ratio between a quantity of data structures impacted by the data structure lock commands and a quantity of data structures that the user has permission to lock. For example, if a user locked three files and have privileges to one hundred files, then the ratio may be determined as 3/100. The ratio may be compared to a threshold or other criteria (e.g., specified by the user profile and/or a general profile applicable to all users) to ascertain whether the data structure lock commands are anomalous activity. For example, if the threshold is 0.1 with higher ratios indicating anomalous activity, then in this example the comparison may not indicate anomalous activity of the user.

In an embodiment, the comparison is made by, for each of the data structures impacted by the data structure lock commands, identifying a duration of time that the respective data structure was impacted by a corresponding data structure lock command. The lock durations may be compared to a threshold or other criteria (e.g., specified by the user profile and/or a general profile applicable to all users) to ascertain whether the data structure lock commands are anomalous activity. For example, if the threshold is 10 seconds with lower durations indicating anomalous activity, then in this example the comparison may not indicate anomalous activity of the user if the suspect activity log indicates that the user opens files (which may lock them) for 10 minutes on average.

In an embodiment, the comparison is made by, for each of the data structures impacted by the data structure lock commands, identifying a latency of response by storage devices impacted by the data structure lock commands applied to the data structures. The latency of response may be compared to a threshold or other criteria (e.g., specified by the user profile and/or a general profile applicable to all users) to ascertain whether the data structure lock commands are anomalous activity. For example, if the threshold is 0.01 seconds with higher latencies indicating anomalous activity, then in this example the comparison may not indicate anomalous activity of the user if the suspect activity log indicates that the storages all were able to maintain latencies of less than 0.01 seconds while the user accessed data structures stored in the storages.

The determination may be made, for example, using multiple criteria. For example, any of the criteria discussed above may be used to define an objective function that may weigh the storage latencies, duration of access, substantive and non-substantive uses of locked data structures, and/or other factors. The objective function may take these parameters as input and output a numerical value which may be compared to a threshold value that delineates anomalous from normal activity.

At operation 304, it is determined whether the data structure lock commands are anomalous activity. The determination may be made based on the outcome of the comparison made in operation 302.

If it is determined that the data structure lock commands are anomalous activity, then the method may proceed to operation 306. Otherwise the method may end following operation 306.

At operation 306, an action set is performed to facilitate access to data structures stored in the distributed system that are impacted by the data structure lock commands. For example, the data structure lock commands may prevent other users from access the data structures.

The action set may be performed by performing actions of the actions set. The action set may include any number and type of actions. The actions may include any of (i) issuing unlock commands for the impacted data structures, (ii) limiting privilege of the user (e.g., to reduce or prevent the user's from locking other data structures) or taking other action to limit the user's ability to operate within or otherwise use the distributed system, (iii) sending notifications to administrators or other persons, and/or (iv) performing other actions to reduce an impact of the anomalous activity on the distributed system.

The method may end following operation 306.

Using the method illustrated in FIG. 3, embodiments disclosed herein may provide a system that may proactively address threats to continued desirable operation of data processing systems presented through data structure locking mechanisms utilized in multi-user systems.

To further clarify embodiments disclosed herein, an action diagrams in accordance with an embodiment is shown in FIGS. 4-5. The diagrams illustrate actions and interactions that may be performed by various components shown in FIG. 1. In FIGS. 4-5, blocks lower on the page generally indicate actions, functions, etc. performed after actions higher on the page. However, the functions, actions, etc. indicated in each block may be performed in other orders and/or entirely or partially concurrently with other blocks. Lines terminating in arrows between the lines descending from the blocks with "data processing system", "storage", and "storage manager" indicate communications between these components whereas the blocks overlaying the descending line indicate actions, functions, etc. substantially performed by the entity from which the line descends. Liked named components in FIGS. 1, 4, and 5 may be similar.

Now, consider an example scenario as illustrated in FIG. 4 where a deployment includes data processing system 400. As part of its functionality, data processing system 400 and/or other devices may store data in and use data stored in storage 402, which may be a network accessible storage or a local storage. The data stored in storage 402 may be subject to locking as part of a data management system implemented by storage 402 and/or the deployment. Storage manager 406 may be tasked with proactively addressing threats to continued access to the data stored in storage 402.

As seen in block 410, a malicious login to data processing system 400 may occur. For example, a malicious party that has obtained access credential for a privileged user may login to data processing system 400 with the intent of disrupting operation of data processing system 400 and/or other data processing systems of a deployment. To do so, the malicious party, through data processing system 400, may send file lock commands for various files at blocks 412-416.

These file lock commands may lock the files to which the privileged user has access, and which may be relied upon by other users, devices, and/or the deployment as a whole. When so locked, the others that rely on access to these locked files may be prevented from accessing the locked files.

As part of the security framework implemented by the deployment, data processing system 400 thereof, and storage manager 406 may monitor and log the file lock commands as an activity log of the user.

At block 418, data processing system 400 may provide the activity log to storage manager 406. Storage manager 406 may, at block 420, perform anomalous activity detection using the activity log. In this example, the anomalous activity detection may be performed by calculating a ratio of data structures impacted by the activity of the user indicated in the activity log to the number of data structures that the user is privileged to access. In this example, as noted above, the malicious party indiscriminately locks files. Consequently, the calculated ratio is very large since the malicious party is attempting to lock all of the files to which the privileged user has access.

Based on this determination, storage manager 406 determines that the file lock commands issued by the user of data processing system 400 are anomalous. Consequently, at block 422, storage manager 406 issues file unlock commands for the impacted files to storage 402. Accordingly, access to the previously locked files is regained by the users of the files.

Additionally, at block 424, storage manager 406 issues a privilege restriction to the privileged user which denies the privileged user the ability to lock files. By doing so, both access to the previously locked files may be restored and future activity of the malicious party may be proactively curtailed.

While successful in this example, malicious parties may attempt to take action to evade detection by automated systems as disclosed herein.

Now, consider a second example scenario as illustrated in FIG. 5 where a deployment includes data processing system 500. As part of its functionality, data processing system 500 and/or other devices may store data in and use data stored in storage 502, which may be a network accessible storage or a local storage. The data stored in storage 502 may be subject to locking as part of a data management system implemented by storage 502 and/or the deployment. Storage manager 506 may be tasked with proactively addressing threats to continued access to the data stored in storage 502.

In contrast to FIG. 4, at block 510, the malicious party that logs into data processing system 500 is more sophisticated. After login, the malicious party take a more nuanced approach at blocks 512-518 through issuance of file lock (e.g., blocks 512, 516) and file unlock commands (e.g., blocks 514, 518). Consequently, while the files may be locked for durations of time, the files may not be concurrently locked for long durations of time. Accordingly, the activity of the malicious party may not be detected through analysis of ratios of locked to privileged files, as discussed with respect to FIG. 4, but may still negatively impact the ability of other users to access the at least temporarily locked files.

As part of the security framework implemented by the deployment, data processing system 500 thereof, and storage manager 506 may monitor and log the file lock and unlock commands as an activity log of the user to establish a locking pattern which may indicate file lock/unlock times and/or latency of storage 502 when subject to these commands. For example, due to the increased quantity of access commands, a more regimented lock/unlock pattern may be identifiable in the activity log and the latency of servicing the commands by storage 502 may increase due to command volume.

At block 420, data processing system 500 may provide the activity log to storage manager 506. Storage manager 506 may, at block 522, perform anomalous activity detection using the activity log. In this example, the anomalous activity detection may be performed by comparing the lock/unlock times and/or durations to identify whether they correspond to regimented patterns, and also comparing the latency of storage 502 to typical latencies of storage 502. In this example, the patterns are sufficiently regimented to indicate anomalous activity, and an increased latency of storage 502 may also indicate anomalous activity.

Based on this determination, storage manager 506 determines that the file lock commands issued by the user of data processing system 500 are anomalous. Consequently, at block 524, storage manager 506 issues file unlock commands for the impacted files to storage 502. Accordingly, access to the previously locked files is regained by the users of the files.

Additionally, at block 526, storage manager 406 issues a privilege restriction to the privileged user which denies the privileged user the ability to lock files. By doing so, both access to the previously locked files may be restored and future activity of the malicious party may be proactively curtailed.

Thus, as illustrated in FIG. 5, embodiments disclosed herein may facilitate proactive identification and/or remediation of maliciously locked data structures. Consequently, the impact of malicious activity on a system may be reduced by limiting the potential scope of such malicious activities. Accordingly, a system in accordance with embodiments disclosed herein may provide a higher uptime, may provide more responsive computer implemented services, and/or may incur reduced computational overhead for remediating malicious activities.

Figure 6:
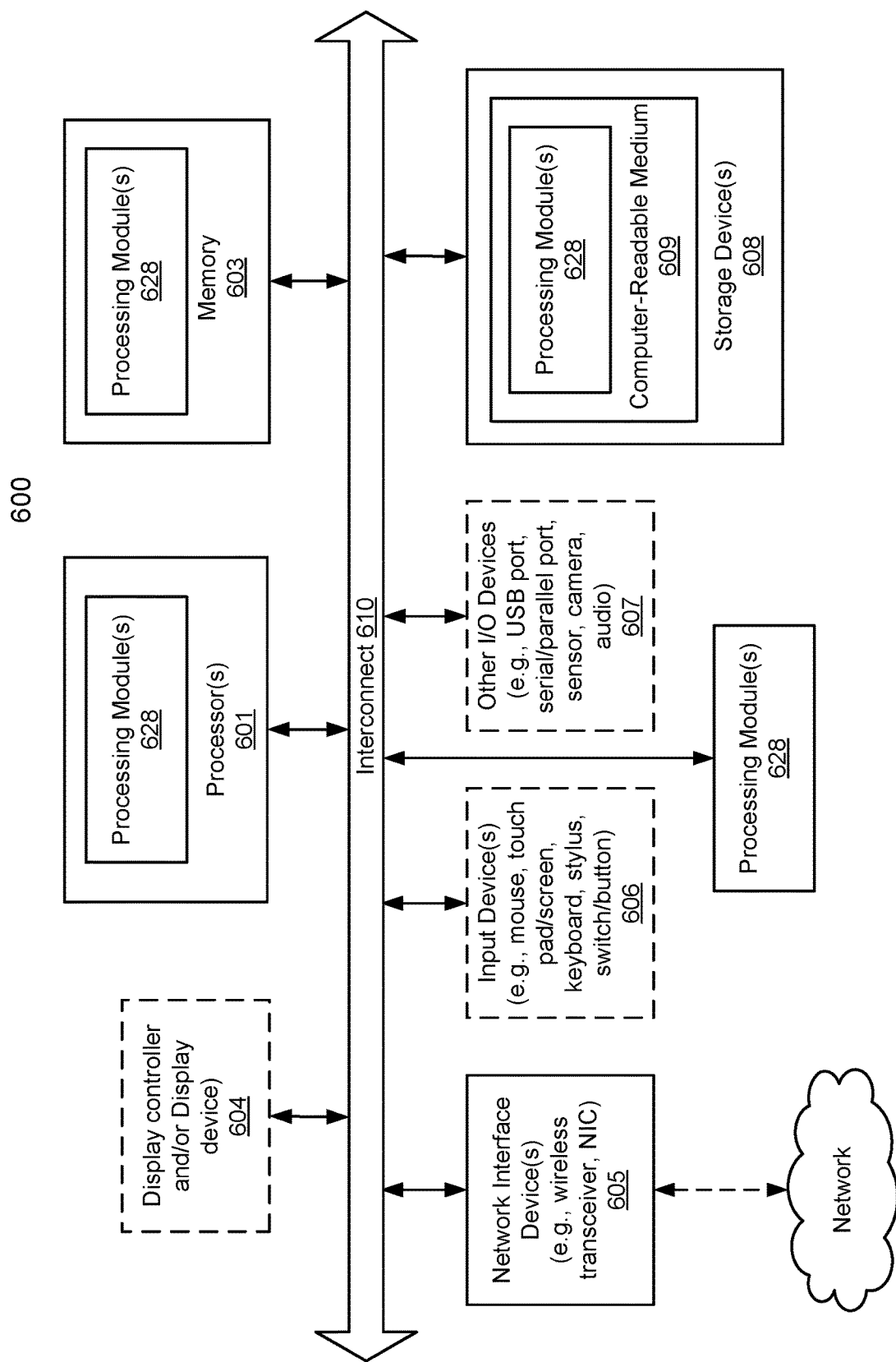
FIG. 6 shows a block diagram illustrating a computing device in accordance with an embodiment.

Any of the components illustrated in FIGS. 1-5 may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for managing data in a distributed system, the method comprising:
    obtaining a suspect activity log for a user of the distributed system, the suspect activity log being based on data structure lock commands issued by the user for data structures stored in the distributed system;
    performing a comparison between the suspect activity log for the user and a user profile for the user to determine whether the data structure lock commands are anomalous activity for the user; and
    in an instance where the data structure lock commands are anomalous activity for the user:
        identifying the data structures impacted by the data structure lock commands as maliciously locked data structures; and
        performing an action set to facilitate access, for other users of the distributed system beside the user that issued the data structure lock commands, to the maliciously locked data structures without having to receive a data structure unlock command from the user.

2. The computer-implemented method of claim 1, wherein
    the data structures that are impacted by the data structure lock commands are locked data structures that are in an access locked state, and
    performing the comparison comprises:
        determining whether the user has used each of the locked data structures while each of the locked data structures is in the access locked state to identify a ratio of the locked data structures that have been used by the user while in the access locked state to a total number of the locked data structures; and
        determining that the data structure lock commands are anomalous activity in an instance where the ratio exceeds a predetermined threshold.

3. The computer-implemented method of claim 1, wherein performing the comparison comprises:
    identifying a ratio between a quantity of data structures impacted by the data structure lock commands and a quantity of data structures that the user has permission to lock; and
    determining that the data structure lock commands are anomalous activity in an instance where the ratio exceeds a predetermined threshold.

4. The computer-implemented method of claim 1, wherein performing the comparison comprises:
    for each of the data structures impacted by the data structure lock commands, identifying a duration of time that the respective data structure was impacted by a corresponding data structure lock command;

making a comparison between the duration of time and a corresponding duration of time specified by a user profile associated with the user to identify a quantity of data structures that were unavailable to other users for over a duration of time that exceeds a first predetermined threshold; and determining that the data structure lock commands are anomalous activity in an instance where the quantity exceeds a second predetermined threshold.

5. The computer-implemented method of claim 1, wherein performing the action set comprises:

issuing ones of the data structure unlock command for at least a portion of the data structures stored in the distributed system that are impacted by the data structure lock commands to forcefully override the data structure lock commands impacting the portion of the data structures.

6. The computer-implemented method of claim 5, wherein performing the action set further comprises:

preventing the user from issuing additional data structure lock commands.

7. The computer-implemented method of claim 1, wherein the user profile indicates a types of data structures regularly accessed by the user, and durations of time that the user locks the data structures.

8. The computer-implemented method of claim 1, further comprising:

prior to obtaining the suspect activity log, monitoring data structure access patterns for the user to facilitate generation of the user profile.

9. The computer-implemented method of claim 8, further comprising:

identifying types of data structures indicated by the data structure access patterns; and populating the user profile with access frequencies for the types of the data structures.

10. The method of claim 1, wherein performing the comparison comprises:

identifying a storage device of the distributed system in which the data structures impacted by the data structure lock commands are stored;

measuring a latency of the storage device, the latency indicating a first amount of time used by the storage device to service a first command issued to the storage device after the suspect activity log has been obtained;

comparing the latency measured to a historical latency of the storage device, the historical latency indicating a second amount of time used by the storage device to service a second command issued to the storage device before the suspect activity log was obtained; and determining that the data structure lock commands are anomalous activity when the first speed is slower than the second speed.

11. The method of claim 10, wherein the first and second commands are identical commands.

12. The method of claim 1, wherein before performing the action set to facilitate the access to the maliciously locked data structures for the other users, the other users are unable to access and use the maliciously locked data structures in any way.

13. A non-transitory machine-readable medium having instructions stored therein, which when executed by a processor, cause the processor to perform operations to manage data in a distributed system, the operations comprising:

obtaining a suspect activity log for a user of the distributed system, the suspect activity log being based on data structure lock commands issued by the user for data structures stored in the distributed system;

performing a comparison between the suspect activity log for the user and a user profile for the user to determine whether the data structure lock commands are anomalous activity for the user; and in an instance where the data structure lock commands are anomalous activity for the user:

identifying the data structures impacted by the data structure lock commands as maliciously locked data structures; and performing an action set to facilitate access, for other users of the distributed system beside the user that issued the data structure lock commands, to the maliciously locked data structures without having to receive a data structure unlock command from the user.

14. The non-transitory machine-readable medium of claim 13, wherein performing the comparison comprises:

for each of the data structures impacted by the data structure lock commands, identifying whether the user made a substantive use of the respective data structure while impacted by a corresponding data structure lock command to identify a ratio of substantively used data structures to non-substantively used data structures; and determining that the data structure lock commands are anomalous activity in an instance where the ratio exceeds a predetermined threshold.

15. The non-transitory machine-readable medium of claim 13, wherein performing the comparison comprises:

identifying a ratio between a quantity of data structures impacted by the data structure lock commands and a quantity of data structures that the user has permission to lock; and determining that the data structure lock commands are anomalous activity in an instance where the ratio exceeds a predetermined threshold.

16. The non-transitory machine-readable medium of claim 13, wherein performing the comparison comprises:

for each of the data structures impacted by the data structure lock commands, identifying a duration of time that the respective data structure was impacted by a corresponding data structure lock command;

making a comparison between the duration of time and a corresponding duration of time specified by a user profile associated with the user to identify a quantity of data structures that were unavailable to other users for over a duration of time that exceeds a first predetermined threshold; and determining that the data structure lock commands are anomalous activity in an instance where the quantity exceeds a second predetermined threshold.

17. A data processing system, comprising:

a processor; and a memory coupled to the processor to store instructions, which when executed by the processor, cause the processor to perform operations for managing data in a distributed system, the operations comprising:

obtaining a suspect activity log for a user of the distributed system, the suspect activity log being based on data structure lock commands issued by the user for data structures stored in the distributed system;

performing a comparison between the suspect activity log for the user and a user profile for the user to determine whether the data structure lock commands are anomalous activity for the user; and in an instance where the data structure lock commands are anomalous activity for the user:
- identifying the data structures impacted by the data structure lock commands as maliciously locked data structures; and
- performing an action set to facilitate access, for other users of the distributed system beside the user that issued the data structure lock commands, to the maliciously locked data structures without having to receive a data structure unlock command from the user.

18. The data processing system of claim 17, wherein performing the comparison comprises:
- for each of the data structures impacted by the data structure lock commands, identifying whether the user made a substantive use of the respective data structure while impacted by a corresponding data structure lock command to identify a ratio of substantively used data structures to non-substantively used data structures; and
- determining that the data structure lock commands are anomalous activity in an instance where the ratio exceeds a predetermined threshold.

19. The data processing system of claim 17, wherein performing the comparison comprises:
- for each of the data structures impacted by the data structure lock commands, identifying duration of time that the respective data structure was impacted by a corresponding data structure lock command;
- making a comparison between the duration of time and a corresponding duration of time specified by a user profile associated with the user to identify a quantity of data structures that were unavailable to other users for over a duration of time that exceeds a first predetermined threshold; and
- determining that the data structure lock commands are anomalous activity in an instance where the quantity exceeds a second predetermined threshold.

20. The data processing system of claim 17, wherein performing the comparison comprises:
- identifying a ratio between a quantity of data structures impacted by the data structure lock commands and a quantity of data structures that the user has permission to lock; and
- determining that the data structure lock commands are anomalous activity in an instance where the ratio exceeds a predetermined threshold.

\* \* \* \* \*